US010275605B2

(12) United States Patent
Elhassen et al.

(10) Patent No.: US 10,275,605 B2
(45) Date of Patent: Apr. 30, 2019

(54) SYSTEM AND METHOD FOR SUPPORTING SECURE DOCUMENT TAGS FOR USE IN TRADITIONALLY UNSUPPORTED WORKFLOWS

(71) Applicant: Xerox Corporation, Norwalk, CT (US)

(72) Inventors: Adam Elhassen, Victor, NY (US); Jason Slack, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 157 days.

(21) Appl. No.: 15/626,770

(22) Filed: Jun. 19, 2017

(65) Prior Publication Data

US 2018/0365437 A1    Dec. 20, 2018

(51) Int. Cl.
| G06F 21/60 | (2013.01) |
| G06F 17/30 | (2006.01) |
| H04N 1/44 | (2006.01) |
| G06F 3/12 | (2006.01) |
| G06F 16/93 | (2019.01) |

(52) U.S. Cl.
CPC ......... *G06F 21/608* (2013.01); *G06F 3/1222* (2013.01); *G06F 3/1238* (2013.01); *G06F 3/1276* (2013.01); *G06F 3/1284* (2013.01); *G06F 16/93* (2019.01); *G06F 17/30011* (2013.01); *H04N 1/4446* (2013.01)

(58) Field of Classification Search
None
See application file for complete search history.

(56) References Cited

U.S. PATENT DOCUMENTS

| 7,526,812 | B2 | 4/2009 | DeYoung | |
| 7,611,053 | B2 | 11/2009 | Nakanowatari et al. | |
| 7,933,889 | B2 | 4/2011 | Smetters et al. | |
| 2002/0097431 | A1* | 7/2002 | Ikegami | G06F 21/608 358/1.15 |
| 2003/0182475 | A1* | 9/2003 | Gimenez | G06F 21/10 710/8 |
| 2004/0006542 | A1* | 1/2004 | Gilliam | G06F 21/10 705/51 |
| 2004/0039704 | A1 | 2/2004 | Gilliam et al. | |
| 2004/0125402 | A1 | 7/2004 | Kanai et al. | |
| 2005/0052700 | A1 | 3/2005 | Mackenzie et al. | |
| 2007/0100837 | A1 | 5/2007 | Martin | |
| 2008/0151284 | A1 | 6/2008 | Morales et al. | |
| 2009/0185223 | A1 | 7/2009 | Kanai et al. | |
| 2010/0097632 | A1 | 4/2010 | Hattori | |
| 2010/0110465 | A1 | 5/2010 | Ferlitsch et al. | |

(Continued)

*Primary Examiner* — Ponnoreay Pich
(74) *Attorney, Agent, or Firm* — Michael J. Nickerson; Basch & Nickerson LLP (57) ABSTRACT

A system and method to recognize the utilization of an unsupported workflow process to process the document to be rendered; write, when it is recognized that an unsupported workflow process is to be utilized in processing the document, security information, from a document security tag associated with the document, in a supported area in the document, to create a modified document, the modified document having security information, from the document security tag, written therein; process, using the unsupported workflow process, the modified document; and render, by the printing system, the modified document in accordance the security, governance, or tracking measures documented in the document security tag associated with the document.

16 Claims, 5 Drawing Sheets

(56) References Cited

U.S. PATENT DOCUMENTS

| | | |
|---|---|---|
| 2010/0180345 A1 | 7/2010 | Manchala et al. |
| 2010/0211488 A1* | 8/2010 | McSpadden ............ G06F 21/10 |
| | | 705/34 |
| 2010/0299763 A1* | 11/2010 | Marcus .................. G06Q 10/06 |
| | | 726/30 |
| 2012/0072999 A1 | 3/2012 | Ishigo et al. |
| 2012/0194841 A1 | 8/2012 | Ito et al. |
| 2012/0224211 A1 | 9/2012 | Ferlitsch et al. |
| 2012/0250075 A1 | 10/2012 | Dumitrescu et al. |
| 2012/0257252 A1 | 10/2012 | Shah |
| 2012/0262748 A1 | 10/2012 | Tan |
| 2016/0077776 A1 | 3/2016 | Balinsky et al. |
| 2017/0053123 A1 | 2/2017 | Sitrick et al. |

* cited by examiner

SYSTEM AND METHOD FOR SUPPORTING SECURE DOCUMENT TAGS FOR USE IN TRADITIONALLY UNSUPPORTED WORKFLOWS

BACKGROUND

Figure 1:
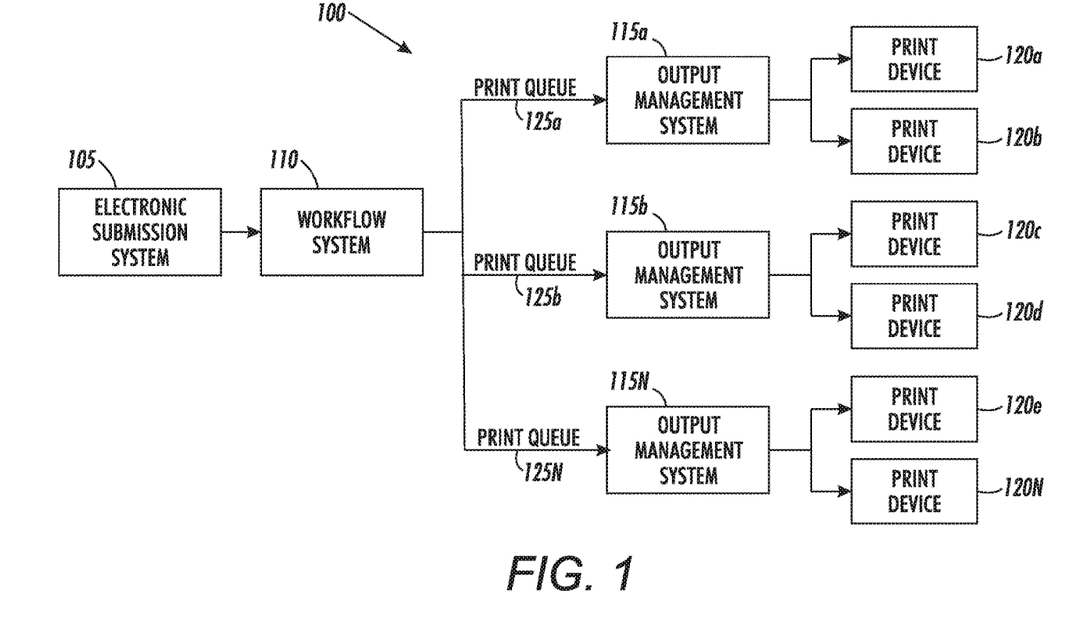
FIG. 1 illustrates a conventional document production environment.

FIG. 1 is a block diagram that shows a conventional document production environment 100. A document enters the document production environment manually or electronically at an electronic submission system 105, such as a computing device and/or scanner. Documents may be sorted and batched at the electronic submission system 105.

As illustrated in FIG. 1, the document is received by a workflow system 110, which processes the document before sending the processed document to one or more of the output management systems 115a-115N. The output management system manages an associated print device or print devices 120a-120N. The output management system can assign a particular document to a particular print device based on the print device's availability, the document's print attributes, etc.

With respect to the conventional system of FIG. 1, a print stream including a document to be printed, having Digital Rights Management privileges, is received by an output management system. The Digital Rights Management privileges are conventionally stored in a metadata tag associated with or assigned to the document to be printed.

A metadata tag is information that resides in a file or object that may be outside the file containing the actual document to be printed, or embedded directly within the actual document to be printed.

In the system illustrated in FIG. 1, the workflow system 110 properly conveys the metadata tag associated with or assigned to the document to be printed to the output management system (115a-115N) so that the security parameters or restrictions assigned to the document to be printed can be realized when printing the document; however, the metadata tag is not conveyed to the print devices (120a-120N).

Figure 3:
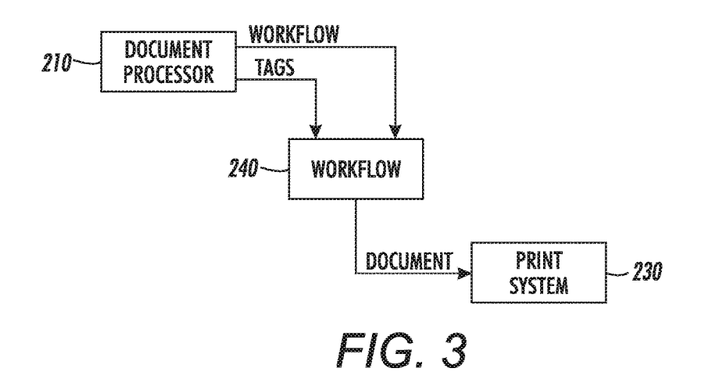
FIG. 3 illustrates a conventional system for rendering a document not in accordance with the security, governance, or tracking measures, which may have been associated with the document through the associated metadata tag.

Another example of such a conventional system is illustrated in FIG. 3, wherein a document to be printed and associated metadata tag are initially processed by a document processor 210 and communicated to a workflow system 240.

As illustrated in FIG. 3, a document to be printed and associated metadata tag are initially processed by a document processor 210 and communicated to a workflow system 240. However, the workflow system 240 of FIG. 3 fails to support the conveyance or communication of the document to be printed with the associated metadata tag(s) to the printing system 230.

In this conventional system of FIG. 3, the associated metadata tag(s) are lost so that the security parameters or restrictions assigned to the document to be printed cannot be realized by the printing system 230 when printing the document.

Although a single communication path is illustrated between the workflow system 240 and the printing system 230 in FIG. 3, the associated metadata tag(s) are not communicated to the printing system 230.

By failing to convey the associated metadata tag(s) to the printing system 230, the security, governance, or tracking measures, which may have been associated with a document through the associated metadata tag(s), are prevented from being realized in the downstream process (printing process).

Thus, it is desirable to provide a system or process that recognizes a non-metadata tag preserving workflow system and preserves the information in the metadata tag within the actual print stream of the document to be printed so that an enabled printing system can print the document in accordance with the security, governance, or tracking measures, which may have been associated with the document through the associated metadata tag.

It is further desirable to provide a system or process that recognizes a non-metadata tag preserving workflow system and preserves the information in the metadata tag within the actual print stream of the document to be printed so that a non-enabled printing system can print the document without corruption to the document but not in accordance with the security, governance, or tracking measures, which may have been associated with the document through the associated metadata tag.

DETAILED DESCRIPTION OF THE DRAWINGS

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts may be properly illustrated.

The term, "document," refers to a logical unit of work that is processed in a document production environment. A document may include text, images, and/or the like, and may be embodied in an electronic format or a physical substrate.

The phrase, "print attributes," refers to the characteristics of a printed document, such as ink type, gloss, paper size, paper weight, and/or the like.

The phrase, "Digital Rights Management document," refers to a document having an associated Digital Rights Management license.

The phrase, "printing device," refers to an electronic apparatus that is capable of receiving commands, printing text, vector graphics, and/or images on a substrate, and optionally, also scanning or otherwise processing a document. Printing devices may include, but are not limited to, network printers, production printers, copiers, facsimile machines, and/or other devices using ink or toner.

The phrase, "output management system," refers to a computer system that schedules and/or directs documents to printing devices. An output management system may include one or more computing or other devices needed to output a document. An output management system in a print environment may include one or more computing devices and/or printing devices needed to output a document.

The phrase, "Digital Rights Management privileges," refers to access control rights that impose limitations on how digital content can be used, accessed, modified, printed, and/or the like. Digital Rights Management privileges may include limitations as to who can access the document, how many copies of the document can be printed, who is able to modify the document and/or the like.

The phrase, "Digital Rights Management license," refers to a file that describes the Digital Rights Management privileges associated with a Digital Rights Management document. A Digital Rights Management license may be a separate file or it may be part of a document. For example, a Digital Rights Management license may describe Digital Rights Management privileges to a Digital Rights Management document's content, identify the users or devices to whom the rights are granted and/or identify the conditions under which the rights are granted.

The phrases, "workflow process" or "workflow system," refer to a computer system that implements and/or performs an ordered sequence of operations to enable processing of a document.

The phrase, "printing system" refers to a system including, but not limited to, a print queue, a printing or output management system, and/or a printing device or printing devices.

In the following description and claims, the phrases, "unsupported workflow process" and/or "unsupported workflow system," refer to a workflow process or system which does not conventionally support, without the operations of another process, the conveyance of metadata tags or document security tags to downstream processes (such as printing) or a workflow process or system which conventionally loses (does not maintain), without the operations of another process, the metadata tags or document security tags as a result of the workflow process.

In other words, in the following description and claims, an unsupported workflow process and/or and unsupported workflow system relies on a process or operation outside its process or system or relies upon a modification of its conventional (normal) process or system to enable the conveyance of metadata tags or document security tags to downstream processes so as to support the persistence of security decisions downstream.

Figure 2:
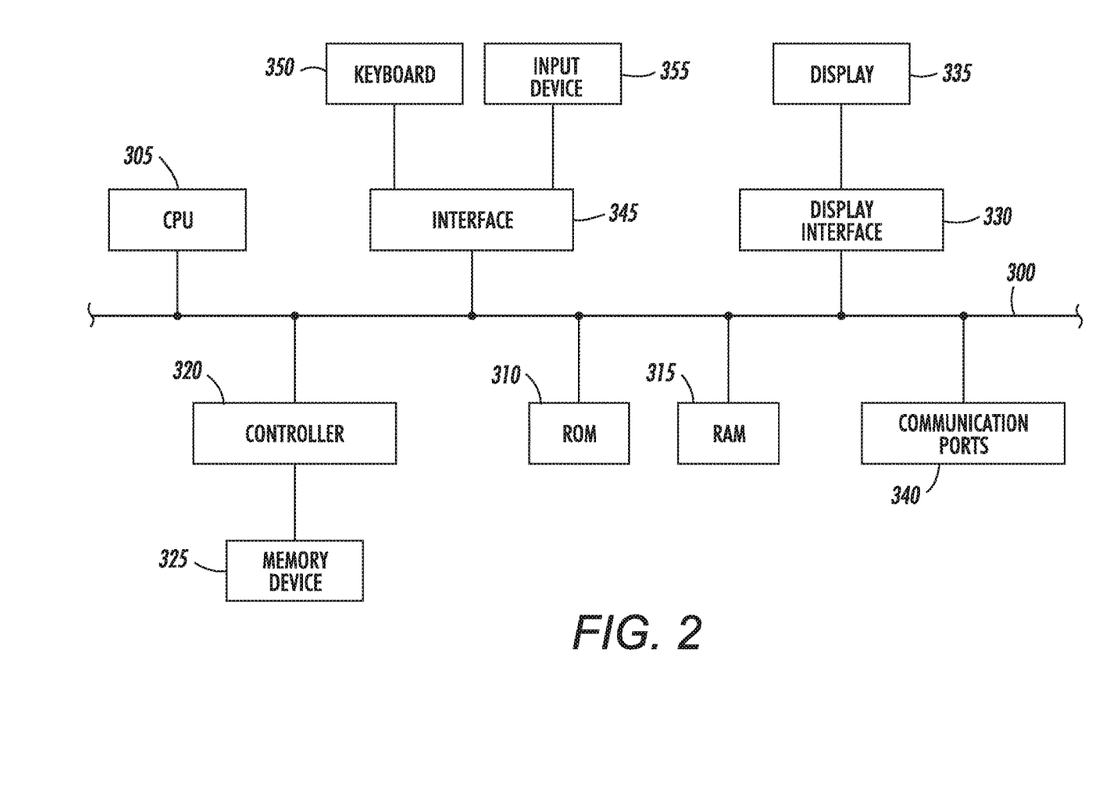
FIG. 2 illustrates conventional internal hardware that may be used to implement program instructions.

FIG. 2 depicts a block diagram of conventional internal hardware that may be used to implement program instructions, such as the process steps discussed below in reference to FIGS. 5 and 6. A system bus 300 interconnects the other illustrated components of the hardware to provide data (communication) paths there between.

A processor 305 performs calculations and logic operations required to carry out the processes discussed below in reference to FIGS. 5 and 6. It is noted that processor 305 may be a central processing unit for the overall system.

A read only memory (ROM) 310 and random access memory (RAM) 315 provide memory devices for the hardware system.

A controller 320 interfaces one or more memory devices 325 to the system bus 300. The memory devices 325 may include, for example, an external or internal DVD drive, a CD ROM drive, a hard drive, flash memory, a USB drive, etc.

Applications, program instructions, software, and/or interactive modules provide the interface and perform any querying and/or analysis associated with data sets that may be stored in the read only memory 310 and/or the random access memory 315.

It is noted that the applications, program instructions, software, and/or interactive modules may be stored on a tangible computer readable medium such as a compact disk, a digital disk, flash memory, a memory card, a USB drive, an optical disc storage medium, and/or other recording medium.

A display interface 330 permits information from the system bus 300 to be displayed on the display 335 in audio, visual, graphic, and/or alphanumeric format. Communication with external devices, such as a printing device, may occur using various communication ports 340. A communication port 340 may be operationally connected to a communications network, such as the Internet or an intranet.

The hardware may also include an interface 345, which allows for receipt of data from a keyboard 350 and/or an input device 335, such as a mouse, a joystick, a touch screen, a remote control, a pointing device, a video input device, and/or an audio input device.

As previously discussed, with respect to FIG. 3, an unsupported workflow process does not support the conveyance of metadata tags or document security tags to downstream processes (such as printing) or loses (does not maintain) the metadata tags or document security tags as a result of the workflow process. Such an unsupported workflow process prevents the security, governance, or tracking measures, which may have been associated with a document, from being realized in the downstream process or processes.

Alternatively, an unsupported workflow process does not support the conveyance of embedded metadata tags or document security tags to downstream processes (such as printing) or loses (does not maintain) the embedded metadata tags or document security tags as a result of the workflow process. Such an unsupported workflow process prevents the security, governance, or tracking measures, which may have been associated with a document, from being realized in the downstream process or processes.

More specifically, once the document, having associated metadata tags or document security tags, enters an unsupported workflow process, any metadata tags, document security tags, and/or potential security protections, which are based upon the metadata tags and/or document security tags, are lost.

One example of an unsupported workflow process is a conventional print driver that converts a document file with any associated metadata tags or document security tags into a file that can be properly processed by a printing device. An example of such a file is a page description language (PDL) file including but not limited to formats such as HP-GL, XPS, PCL, PCL5, PCL XL, GDI, ESC/P2, BJC, PJL/PCL, or other language used in rendering a document.

In such a conventional unsupported workflow process, the converted document files are conveyed or communicated downstream to the printing device for rendering; however, the security, governance, or tracking measures, which may have been associated with a document, are not realized by the printing device.

A metadata tag or a document security tag may describe the rights and/or privileges to the associated document's content, identify the users or devices to whom the rights are granted, and/or identify the conditions under which the rights are granted.

For example, a metadata tag or a document security tag may include information indicating a time before which and/or after which an associated document cannot be printed, a number of copies of the associated document that can be printed at one time, a total number of copies of the associated document that can be printed, a user or users who can print the associated document, a user or users who can view the associated document, classification, or categorization of a document, etc.

The above identified conditions or restrictions are lost when the document is processed by an unsupported workflow process.

Figure 5:
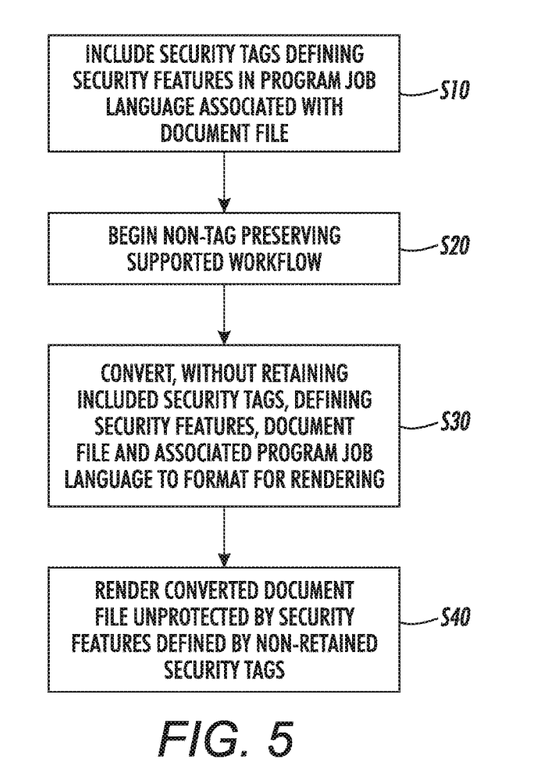
FIG. 5 illustrates a flowchart for a conventional system that renders a document not in accordance with the security, governance, or tracking measures, which may have been associated with the document through the associated metadata tag.

FIG. 5 illustrates a process or system wherein the security, governance, or tracking measures, which may have been associated with a document, are not realized by a printing device.

As illustrated in FIG. 5, at step S10, security features, contained in a metadata file (tag) or document security tag, are included in the program job language file associated with document file to be printed.

At step S20, the program job language file is received by an unsupported workflow process (such as a PRINT process). At step S30, the program job language file is converted to a file having a format that enables the document to be rendered by the printing device.

However, the conversion of step S30 fails to retain the metadata file (tag) or document security tag or the security, governance, or tracking measures documented in the metadata file (tag) or document security tag.

At step S40, the document is rendered by the printing device unprotected by or not in accordance with the security, governance, or tracking measures documented in the non-retained or lost metadata file (tag) or document security tag.

As noted above, it is desirable to provide a solution that perpetuates the metadata tags or document security tags for security and system considerations when encountering an unsupported workflow process that would otherwise lose the metadata tags or document security tags.

Alternatively, it is desirable to perpetuate the security, governance, or tracking measures documented in the metadata tags or document security tags when encountering an unsupported workflow process that would otherwise lose the metadata tags or document security tags.

In other words, once a user attempts to send a document, having associated therewith metadata tags or document security tags, through a workflow process (such as Print) that does not support or maintain the tags or tag information, the process, as described below, recognizes the metadata tags or document security tags and duplicates the metadata tags or document security tags by placing the information or commands associated with metadata tags or document security tags into a supported area of the data transmission, allowing 'next step' or downstream systems to process document activity with security and controls in accordance with the security, governance, or tracking measures, which may have been associated with the document.

Figure 6:
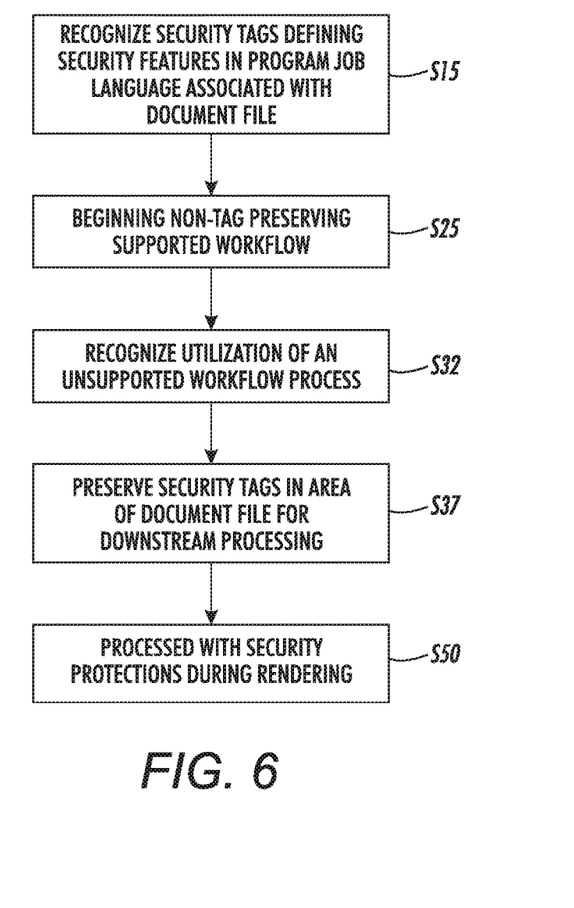
FIG. 6 illustrates a flowchart of a system that renders a document in accordance with the security parameters or restrictions assigned to the document to be printed, wherein a process for embedding the security tag information in a supported area of the document file is included so that the workflow system will not prevent conveyance or communication of the associated security tag to the printing system.

For example, as illustrated in FIG. 6, the process or system, at step S15, recognizes the metadata file (tag) or document security tag included in the program job language file associated with document file to be printed. At step S25, the program job language file is received by an unsupported workflow process (such as a PRINT process).

The process or system of FIG. 6 recognizes the utilization of an unsupported workflow process, at step S32, and based upon the recognition of the unsupported workflow process, at step S32, the process or system of FIG. 6, at step S37, replicates, moves, writes, preserves, or relocates the information or commands in the metadata file (tag) or document security tag into a supported area of the document file for downstream processing. In other words, at step S37, the security tags are preserved and persist in a new form as, for example, page job language (PJL) comments in a PostScript/PCL/or XPS file.

More specifically, the process, at step S37, enables the conveyance metadata tags or document security tags to downstream processes by providing an end-around or backdoor to the unsupported workflow process, which preserves the metadata tags or document security tags, without changing the operations of the unsupported workflow process.

The security tags are typically unique document properties stored either directly within a document container file, such as in the case of Microsoft Word, or in a linked file so as to not corrupt the document container, as is the case for PDF's.

When a file is converted from, for example, Word or PDF to, for example, PostScript, PCL, or XPS, step S37 extracts the security tags from wherever the security tags may be (right in the document or in an external file) and ensures that the security tags continue into the new PostScript, PCL, or XPS container, after processing by the unsupported workflow process, as comments, for example, page job language (PJL) comments. It is noted that the comments may also be XML, or other non-destructive PDL comment types. As illustrated in FIG. 6, at step S50, the document is processed with security protections if the printing device is enabled to process the information or commands replicated within the supported area of the document file.

An example of a supported area of the document file is the header, wherein the information or commands in the metadata file (tag) or document security tag are replicated as comments in the header and the downstream printing device is able to parse the comments from the header so that the document can be rendered in accordance with the security, governance, or tracking measures documented in the external metadata file (tag) or document security tag.

Figure 4:
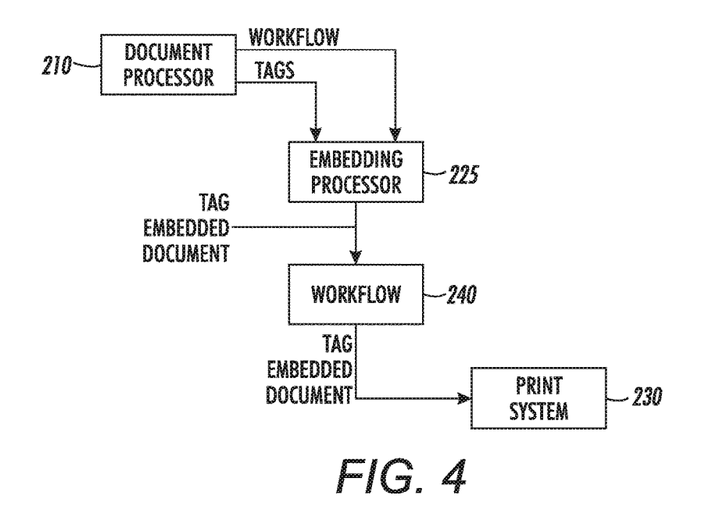
FIG. 4 illustrates a system for rendering a document in accordance with the security parameters or restrictions assigned to the document to be printed, wherein a process for embedding the security tag information in a supported area of the document file is included so that the workflow system will not prevent conveyance or communication of the associated security tag to the printing system.

As illustrated in FIG. 4, a document processor 210 processes a document having an associated metadata file (tag) or document security tag.

However, before the processed document and associated metadata file (tag) or document security tag are communicated to an unsupported workflow process 240, an embedding or replicating process 225 replicates, moves, writes, preserves, or embeds the information or commands in the metadata file (tag) or document security tag into a supported area of the document file, such as a header. In other words, as a result of the embedding or replicating process 225, the security tags are preserved and persist in a new form as, for example, page job language (PJL) comments in a PostScript/PCL/or XPS file.

More specifically, when a file is converted from, for example, Word or PDF to, for example, PostScript, PCL, or XPS, the embedding or replicating process 225 extracts the security tags from wherever the security tags may be (right in the document or in an external file) and ensures that the security tags continue into the new PostScript, PCL, or XPS container, after processing by the unsupported workflow process, as comments, for example, page job language (PJL) comments. It is noted that the comments may also be XML, or other non-destructive PDL comment types.

The modified document file, having the embedded security information is communicated to unsupported workflow process 240, wherein the document file may be converted to a format compatible with the rendering process of a print system 230.

With respect to the various embodiments described above, although the timing of the embedding or replication of the associated metadata file (tag) or document security tag has been described as occurring before the unsupported workflow process, it is noted that the timing of the embedding or replication of the associated metadata file (tag) or document security tag may have occurred before the unsupported workflow process, during (in parallel thereto) the unsupported workflow process, or after the unsupported workflow process so long as information in the associated metadata file (tag) or document security tag is preserved for downstream (post unsupported workflow process) processing.

In summary, a method for perpetuating security, governance, or tracking measures documented in a document security tag associated with a document to be rendered, includes electronically recognizing utilization of an unsupported workflow process to process the document to be rendered; electronically writing, when it is recognized that an unsupported workflow process is to be utilized in processing the document to be rendered, security information, from the document security tag associated with the document to be rendered, into a supported area in the document to be rendered to create a modified document to be rendered, the modified document to be rendered having security information, from the document security tag, written therein; electronically processing, using the unsupported workflow process, modified document to be rendered; electronically parsing, by a printing system, the security information, from the supported area in the modified document to be rendered; and rendering, by the printing system, the modified document to be rendered in accordance the security, governance, or tracking measures documented in the document security tag associated with the document to be rendered.

The supported area may be a header of the document to be rendered.

The document security tag may be embedded within a document container or may be stored in a related metadata file.

The unsupported workflow process may be a process performed by a print driver.

The electronic writing of the security information, from the document security tag associated with the document to be rendered, into a supported area in the document may occur before electronically processing, using the unsupported workflow process, the modified document to be rendered.

The electronic writing of the security information, from the document security tag associated with the document to be rendered, into a supported area in the document may occur in parallel with electronically processing, using the unsupported workflow process, the modified document to be rendered.

The electronic writing of the security information, from the document security tag associated with the document to be rendered, into a supported area in the document may occur after electronically processing, using the unsupported workflow process, the modified document to be rendered.

A system for perpetuating security, governance, or tracking measures documented in a document security tag associated with a document to be rendered, includes a processing system having a processor and a memory; and a printing system having a printing device. The processor recognizes utilization of an unsupported workflow process to process the document to be rendered; writes, when it is recognized that an unsupported workflow process is to be utilized in processing the document to be rendered, security information, from the document security tag associated with the document to be rendered, into a supported area in the document to be rendered to create a modified document to be rendered, the modified document to be rendered having security information, from the document security tag, written therein; and processes, using the unsupported workflow process, modified document to be rendered. The printing system parses, by a printing system, the security information, from the supported area in the modified document to be rendered; and renders the modified document to be rendered in accordance the security, governance, or tracking measures documented in the document security tag associated with the document to be rendered.

The supported area may be a header of the document to be rendered.

The document security tag may be stored in a related metadata file.

The document security tag may be embedded within a document container.

The unsupported workflow process may be a process performed by a print driver.

The processor may electronically locate the security information, from the document security tag associated with the document to be rendered, into a supported area in the document before the processor electronically processes, using the unsupported workflow process, the modified document to be rendered.

The processor may electronically locate the security information, from the document security tag associated with the document to be rendered, into a supported area in the document in parallel with the processor electronically processing, using the unsupported workflow process, the modified document to be rendered.

The processor may electronically locate the security information, from the document security tag associated with the document to be rendered, into a supported area in the document after the processor electronically processes, using the unsupported workflow process, the modified document to be rendered.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method for perpetuating security, governance, or tracking measures documented in a document security tag associated with a document to be rendered, comprising:

(a) electronically recognizing utilization of an unsupported workflow process to process the document to be rendered;

(b) electronically writing, when it is recognized that an unsupported workflow process is to be utilized in processing the document to be rendered, security information, from the document security tag associated with the document to be rendered, into a supported area in the document to be rendered to create a modified document to be rendered, the modified document to be rendered having security information, from the document security tag, written therein;

(c) electronically processing, using the unsupported workflow process, the modified document to be rendered;

(d) electronically parsing, by a printing system, the security information, from the supported area in the modified document to be rendered; and (e) rendering, by the printing system, the modified document to be rendered in accordance the security, governance, or tracking measures documented in the document security tag associated with the document to be rendered.

2. The method as claimed in claim 1, wherein the supported area is a header of the document to be rendered.

3. The method as claimed in claim 1, wherein the document security tag is stored in a related metadata file.

4. The method as claimed in claim 1, wherein the document security tag is embedded within a document container.

5. The method as claimed in claim 1, wherein the unsupported workflow process is a process performed by a print driver.

6. The method as claimed in claim 1, wherein the electronic writing of the security information, from the document security tag associated with the document to be rendered, into a supported area in the document occurs before electronically processing, using the unsupported workflow process, the modified document to be rendered.

7. The method as claimed in claim 1, wherein the electronic writing of the security information, from the document security tag associated with the document to be rendered, into a supported area in the document occurs in parallel with electronically processing, using the unsupported workflow process, the modified document to be rendered.

8. The method as claimed in claim 1, wherein the electronic writing of the security information, from the document security tag associated with the document to be rendered, into a supported area in the document occurs after electronically processing, using the unsupported workflow process, the modified document to be rendered.

9. A system for perpetuating security, governance, or tracking measures documented in a document security tag associated with a document to be rendered, comprising:

a processing system having a processor and a memory; and a printing system having a printing device;

said processor electronically recognizing utilization of an unsupported workflow process to process the document to be rendered;

said processor electronically locating, when it is recognized that an unsupported workflow process is to be utilized in processing the document to be rendered, security information, from the document security tag associated with the document to be rendered, into a supported area in the document to be rendered to create a modified document to be rendered, the modified document to be rendered having security information, from the document security tag, written therein;

said processor electronically processing, using the unsupported workflow process, the modified document to be rendered;

said printing system electronically parsing the security information, from the supported area in the modified document to be rendered;

said printing system rendering the modified document to be rendered in accordance with the security, governance, or tracking measures documented in the document security tag associated with the document to be rendered.

10. The system as claimed in claim 9, wherein the supported area is a header of the document to be rendered.

11. The system as claimed in claim 9, wherein the document security tag is stored in a related metadata file.

12. The system as claimed in claim 9, wherein the document security tag is embedded within a document container.

13. The system as claimed in claim 9, wherein the unsupported workflow process is a process performed by a print driver.

14. The system as claimed in claim 9, wherein said processor electronically locates the security information, from the document security tag associated with the document to be rendered, into a supported area in the document occurs before said processor electronically processes, using the unsupported workflow process, the modified document to be rendered.

15. The system as claimed in claim 9, wherein said processor electronically locates the security information, from the document security tag associated with the document to be rendered, into a supported area in the document occurs in parallel with said processor electronically processing, using the unsupported workflow process, the modified document to be rendered.

16. The system as claimed in claim 9, wherein said processor electronically locates the security information, from the document security tag associated with the document to be rendered, into a supported area in the document occurs after said processor electronically processes, using the unsupported workflow process, the modified document to be rendered.

* * * * *